Jan. 8, 1963  T. GIZESKI  3,072,146
DIGITAL REGULATOR VALVE
Filed Sept. 24, 1959  7 Sheets-Sheet 1
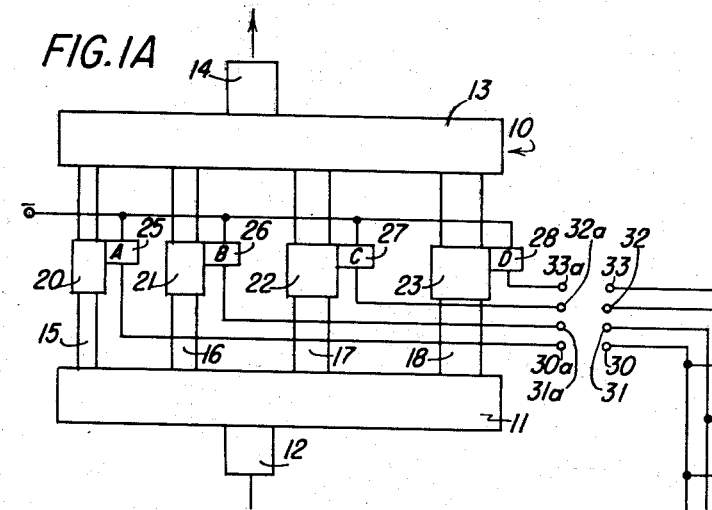
FIG. 1A
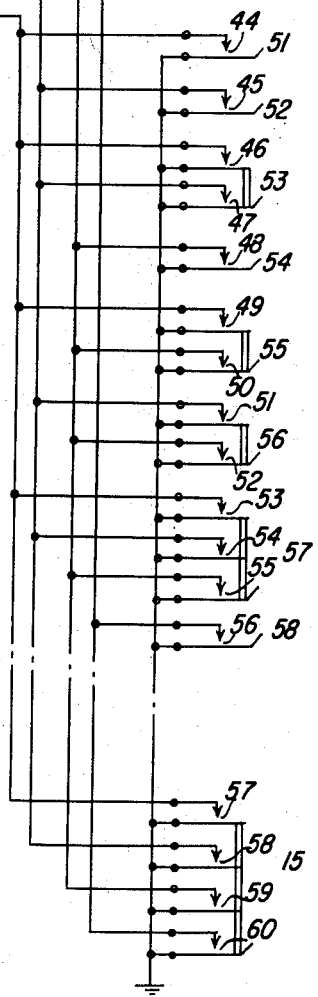
FIG. 1B
FIG. 2
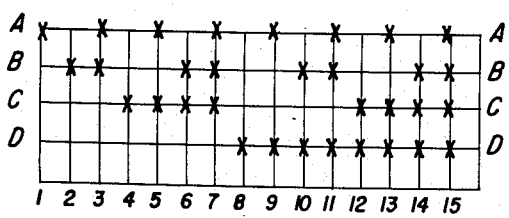
FIG. 3
X—indicates energized actuators
INVENTOR.
Terrence Gizeski
BY
Byron Hume Groen & Clement
Attys.

Jan. 8, 1963 T. GIZESKI 3,072,146
DIGITAL REGULATOR VALVE
Filed Sept. 24, 1959 7 Sheets-Sheet 2

INVENTOR.
Terrence Gizeski
BY
Byron Hume Groen & Clement
Attys.

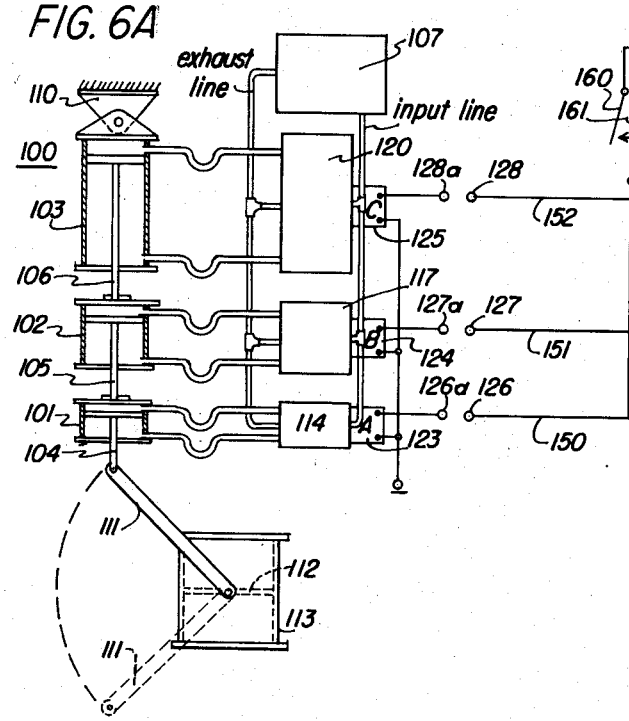
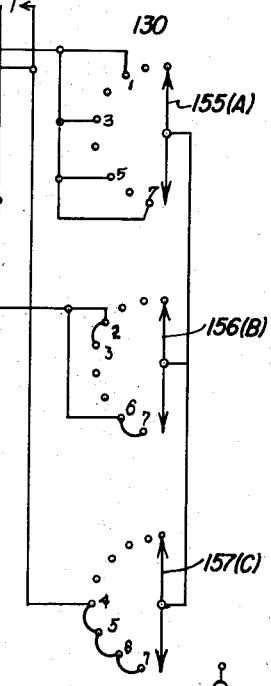
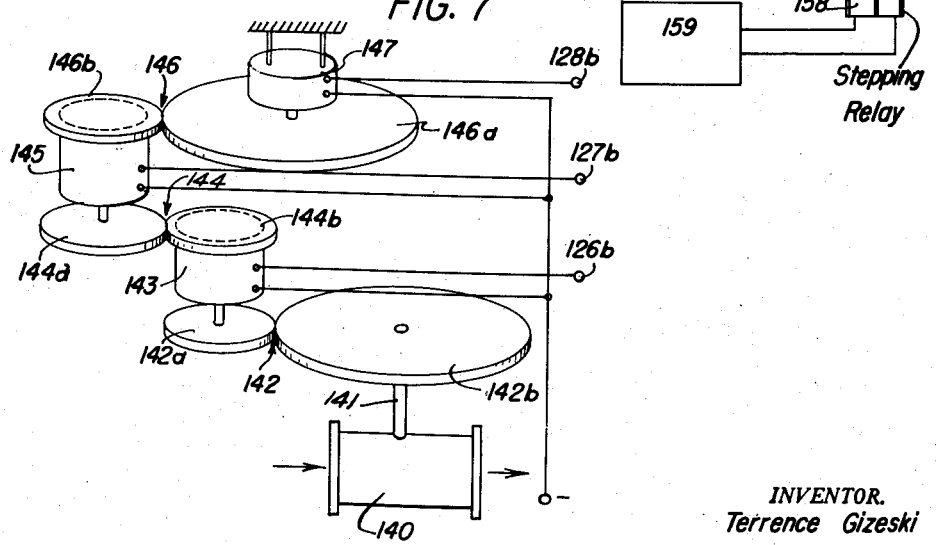
INVENTOR.
Terrence Gizeski

Jan. 8, 1963 T. GIZESKI 3,072,146
DIGITAL REGULATOR VALVE
Filed Sept. 24, 1959 7 Sheets-Sheet 4
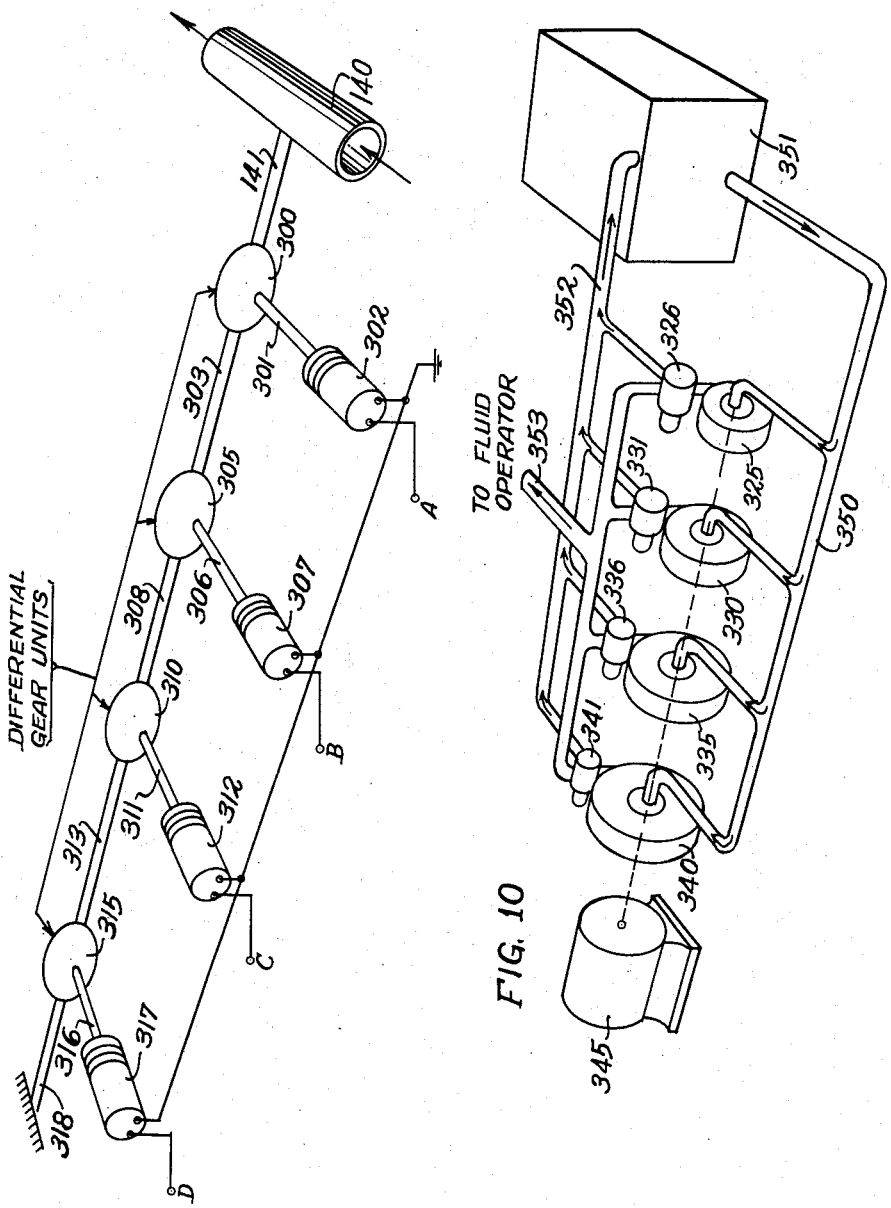
INVENTOR.
Terrence Gizeski
BY
Byron, Hume, Groen & Clement
Attys.

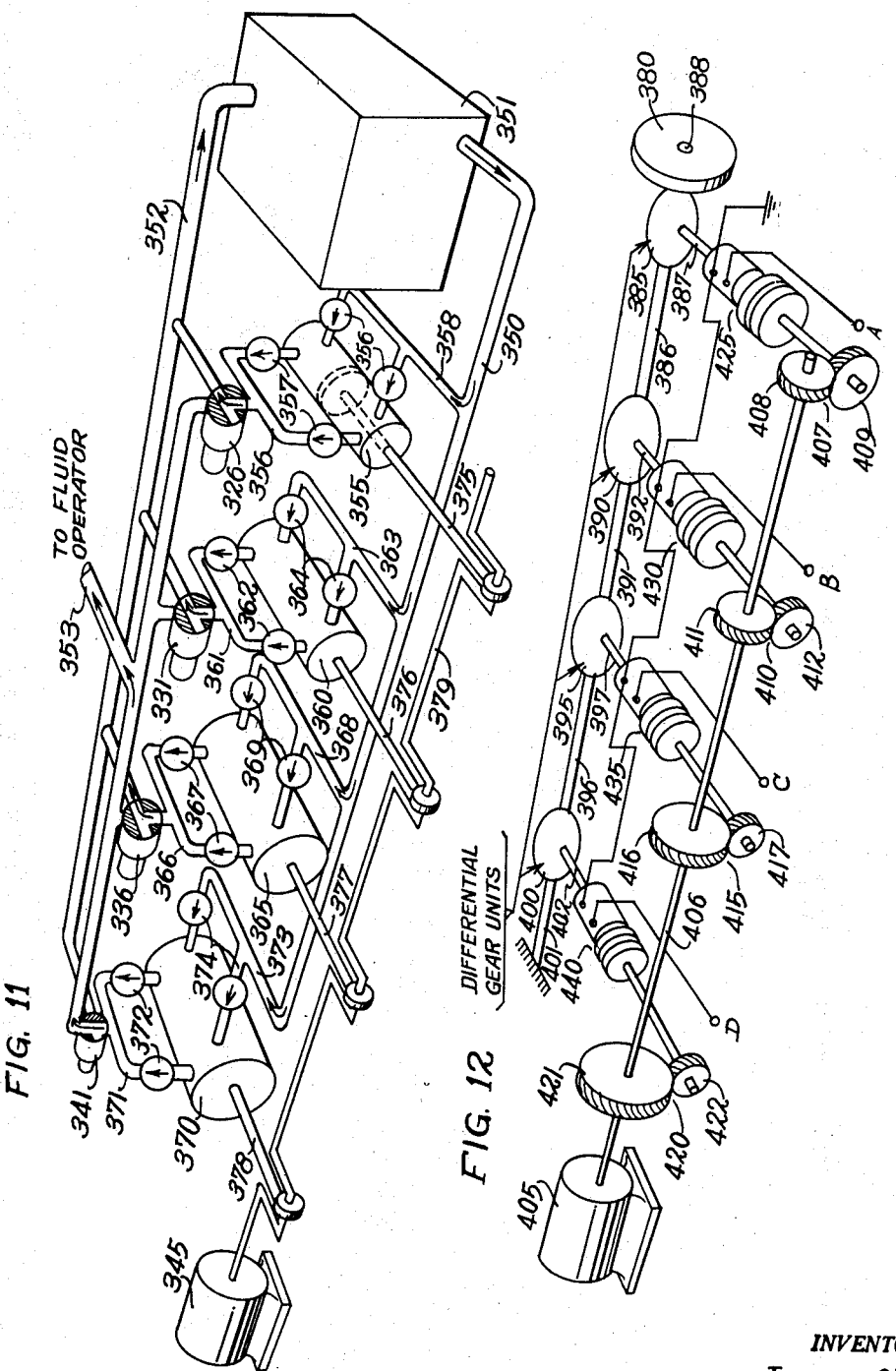

Jan. 8, 1963

T. GIZESKI 3,072,146

DIGITAL REGULATOR VALVE

Filed Sept. 24, 1959

INVENTOR.
Terrence Gizeski
BY
Byron, Hume, Groen & Clement
Attys.

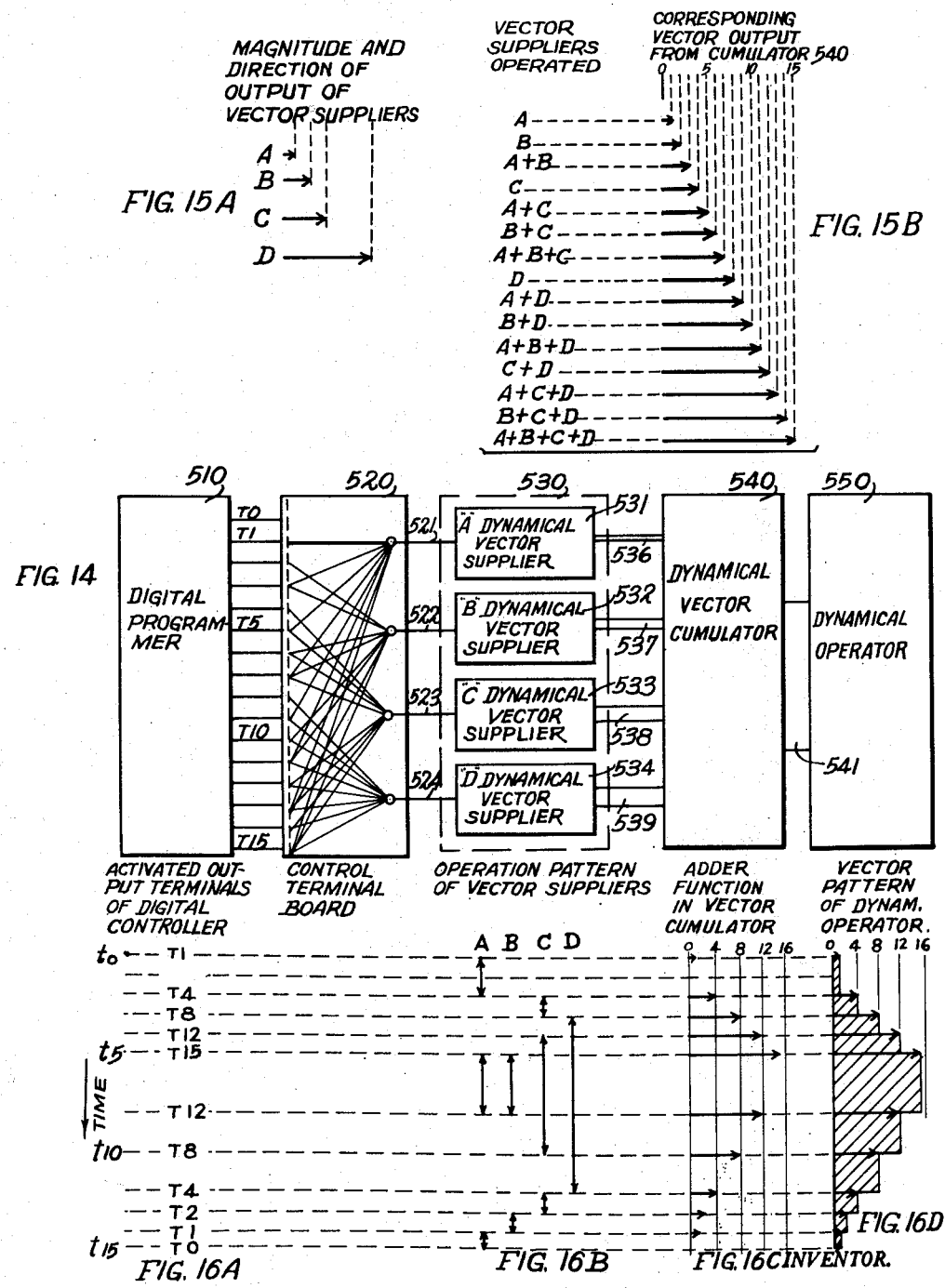

United States Patent Office 3,072,146
Patented Jan. 8, 1963

3,072,146
DIGITAL REGULATOR VALVE
Terrence Gizeski, 11357 S. Normal, Chicago, Ill.
Filed Sept. 24, 1959, Ser. No. 842,165
5 Claims. (Cl. 137—552)

The present invention relates to digital control systems for dynamical operators. By the term "digital control system" is meant a control arrangement which provides for a plurality of control points differing progressively from one another by uniform discrete increments. By the term "dynamical operator" is meant any device, installation or apparatus that is operated by means of a physical force or energy. Accordingly, a furnace operating on energy derived from consuming fuel, a conveyor belt operating according to torque applied thereto and a piston in extension according to the amount of pressure applied thereto, are examples of dynamical operators.

This application is a continuation-in-part of applicant's co-pending application, Serial No. 758,531, filed September 2, 1958, now abandoned.

In the present state of technical development, it is most convenient to accomplish automatic control of a dynamical operator, a furnace, for example, by utilizing a digital programmer which provides on a time basis, digital signals corresponding to the desired liquid fuel flow to the furnace at any given time. However, the flow of fuel to the exemplary furnace is usually administered through a regulating control valve, generally classifiable as an analog device. As an analog device, it does not in itself recognize digital control positions, in this instance port area openings, hence cannot be directly responsive to digital signals. Accordingly, to provide automatic control to this type of analog device, it is a general practice to employ a continuous analog control signal, precise both in amplitude and in time base. To maintain a response to such a continuous analog control signal, the analog device itself must be precise in its response, normally requiring the use of a servo-system with a follow-up control. The complexity of the system requires, of course, critical adjustments and considerable maintenance to achieve reliability and accuracy. Further, for such an analog control element to be employed with a digital programmer, which is the most widely accepted method of programming, a digital-to-analog converter is required and thus the complexity and expense of the system is further increased.

The foregoing is a statement of a problem occurring in the practicing automatic control of a furnace operation. The problem, while stated in the specific, is continuously occurrent in automatic control operation of other forms of dynamical operators. It is to the solution of this continuously occurrent problem that the objects of the present invention are directed.

More specifically, it is an object of the present invention to obviate the digital-to-analog conversion equipment required with conventional regulating control elements when used in combination with a digital programmer.

Another object of the invention is to provide in a system including a dynamical operator to be controlled from a digital programmer, a minimum number of regulators or suppliers intermediate the programmer and the operator, and operative individually or in combination to achieve the required digital control at the operator.

A further object of the invention is to provide a new and improved regulating supply arrangement which may be controlled directly from digital signals and in a binary progression pattern in a manner so as to achieve digital control with a minimum amount of required equipment.

A further object of the invention is to provide in a control system, a digital regulator supplier made up of a nominal number of similar binary control units in which each unit is adjusted to perform a regulating function corresponding to an interger portion in a binary progression and wherein digital regulating operation is performed by the regulator supplier in conjunction with a cumulator and by means of individual and collective operation of the binary control units.

A more specific object of the invention is to provide in a control system including a digital programmer having $2^n$ discrete incremental control signals and including a dynamical operator, a series of $n$ number dynamical vector suppliers bearing specific vectoral relationship to one another wherein the vector output of any one of the suppliers in the series is twice that vector output of the next preceding supplier in the series, a dynamical vector cumulator intermediate the dynamical vector suppliers and the dynamical operator whereby $2^n$ number of discrete incremental vector outputs are available for application directly to the dynamical operator, and a control connection between the digital programmer and the dynamical suppliers arranged in a manner so as to correlate the digital output of the vector cumulator to the digital output of the programmer.

Further objects and features of the invention pertain to the particular structure and arrangements whereby the above outlined objects are achieved. The invention, both as to its principles and mode of use, will be better understood by reference to the following specification and drawings forming a part thereof wherein:

FIGURE 1A is a top plan view of a general purpose digital regulator control valve assembly in accordance with the invention;

FIGURE 1B is a schematic diagram of a manual control circuit for operating the valve assembly of FIGURE 1A;

FIGURE 2 is an end view of another type digital regulator valve assembly for use with the invention;

FIGURE 3 is a chart showing the manner in which the units of the assemblies of FIGURE 1A and 2 are operated to effect digital control;

FIGURE 6A is a digital linear positioner arrangement for utilizing the principles of the invention;

FIGURE 6B is a stepping switch operating circuit for the arrangement of FIGURE 6A;

FIGURE 7 is a digital rotary positioner arrangement for utilizing the principles of the invention;

FIGURE 9 is a schematic representation of another form of a digital rotary positioner arrangement for utilizing the principles of the invention;

FIGURE 10 is a schematic representation of a digital pumping arrangement in accordance with the principles of the present invention utilizing rotary pumps;

FIGURE 11 is a schematic representation of another digital pumping arrangement in accordance with the principles of the invention utilizing reciprocating piston pumps;

FIGURE 12 is a schematic representation of a digital speed control assembly utilizing the principles of the present invention;

FIGURE 14 is a diagrammatic representation in block form of a generalized control system incorporating the principles of the present invention;

FIGURES 15A and 15B are graphic representations of functions occurring within the system of FIGURE 14; and FIGURES 16A to 16D show an illustration of a control function such as may be carried out in the generalized system of FIGURE 14.

Figure 4:
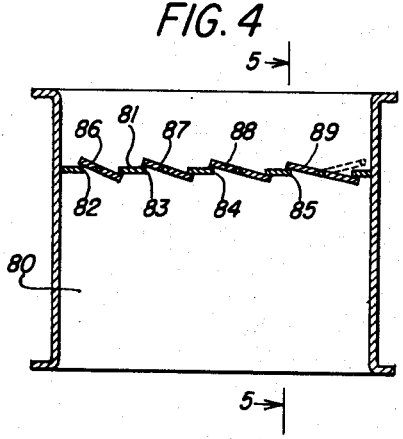
FIGURE 4 is a cross-sectional view of another valve assembly for use with the invention.

Regulation in any type of control system is actually the controlled selection of a fraction of the total range or spectrum of performance by the system. Performance might be measured, for example, as a function of the total area, distance, force, pressure, speed, flow, torque, work and power, to cite some of the various ways by which dynamical units can be measured. To give a specific example, in the case of a flow valve, the ultimate control that can be provided is determined by the total cross-sectional or port area of the valve.

In order to provide digital regulation, the devices such as the valve have to be arranged to be opened progressively and in definite steps so that each step in the progression will be the same. This is in fact digital control. To provide digital control of any consequence for purposes of obtaining accuracy, it is necessary to provide a multiplicity of control points, which is in the ordinary circumstance, means a corresponding number of things controlled and, in the present example, a corresponding number of control valves. However, it has been found that a nominal number of control units, such as valves, can be employed to provide a multiplicity of control points if each valve port area is proportioned to conform to an interger of a binary progression. For example, in a four-unit regulator such as shown in FIGURE 1, the total port area $A_t$ would be equal to the sum of the individual port areas as follows:

$$A_t = A_1 + A_2 + A_3 + A_4$$

wherein the area of any one of the individual ports $A_x$ is:

$$A_X = \frac{2^{x-1}}{2^n - 1} A_t$$

$n$ = number of units in assembly

In an arrangement having such proportionate relationships $2^n$ linear regulating control points are available by operating the units in proper combinations and in proper sequence. Thus in a four-unit system, sixteen linear regulating control points can be achieved. In a system where greater accuracy or where a greater number of linear regulating control points is required, an increased unit system may be employed such as a 10-unit system which will yield 1024 control points. A better understanding of this mathematical presentation will be had from a consideration of the arrangement shown in the drawing.

Referring to FIGURE 1, there is shown therein a regulating valve 10 including an inlet manifold 11 fed by an inlet conduit 12 and an outlet manifold 13 supplying an outlet conduit 14. The inlet manifold 11 and the outlet manifold 13 are linked by flow conduits 15, 16, 17 and 18 which flow conduits include therein control valves 20, 21, 22 and 23, respectively, each provided with an orifice of an area proportioned to the total area of the inlet conduit 12 and outlet conduit 14 in accordance with the binary progression. In the present case, and assuming that the areas of the inlet conduit 12 and outlet conduit 14 each have a total area corresponding to $A_t$, then the orifice and valve unit 20 associated with the conduit 15 will be $1/15$ of the area $A_t$, the area of the orifice and valve 21 associated with the conduit 16 will be $2/15$ of the area $A_t$, the area of the orifice and valve 22 will be $4/15$ of the area $A_t$, and the area of the orifice and valve 23 associated with the conduit 18 will be $8/15$ of the area $A_t$. Associated with the orifice and valve units 20 to 23, are actuating devices A, B, C and D, respectively, such as magnetic solenoids 25, 26, 27 and 28. These solenoids operate respectively from contacts 30a, 31a, 32a and 33a, respectively.

Control of the orifice and valve structures 20, 21, 22 and 23 to achieve linear regulation can be achieved through the switch arrangement shown in FIGURE 1B which is connected in accordance with the pattern shown in FIGURE 3. Specifically, assuming that the terminals 30, 31, 32 and 33 in FIGURE 1B are connected respectively to the terminals 30a, 31a, 32a and 33a of FIGURE 1A, the digital valve arrangement 10 would be operated into the first position upon closure of the contacts 44 of switch S1 which would apply ground potential to the terminal 30 and cause the actuator A to be operated. To operate the digital regulator valve into the second digital position, the contacts 45 of switch S2 would be closed thereby to apply ground potential to the terminal 31 and cause the actuator B to be operated. To operate the digital regulator valve into the third digital position, the contacts 46 and 47 of switch S3 will be closed thereby to apply ground potential to the terminals 30 and 31 thereby to cause actuators A and B to operate jointly. The procedure is continued according to the pattern set forth in FIGURE 3 and as diagrammatically described in part in FIGURE 1B, whereby any one of the digital positions can be manually effected by closing the appropriate switches.

FIGURE 2 illustrates a digital regulating valve 61 provided with a diaphragm 62. The diaphragm is provided with a plurality of ports, here illustrated to be four, including the ports 62, 63, 64 and 65. The cross-sectional areas of these ports are proportioned one to another in accordance with the binary progression pattern set forth above. Specifically, considering that the total area $A_t$ of of the ports is equal to the summation of the cross-sectional areas of the ports 62, 63, 64 and 65, the cross-sectional area of the port 62 is chosen to be $1/15$ of the total area $A_t$, the cross-sectional area of the port 63 is chosen to be $2/15$ of the total area $A_t$, the cross-sectional area of the port 64 is chosen to be $4/15$ of the total area $A_t$ and the cross-sectional area of the port 65 is chosen to be $8/15$ of the total area $A_t$. These ports are provided respectively with valves 66, 67, 68 and 69 each of which is controllable between a blocking and a full open position by means of associated actuator devices A, B, C and D which may be solenoids 70, 71, 72 and 73, respectively.

Operation of the arrangement of FIGURE 2 will be exactly in accordance with that described with reference to the arrangement of FIGURE 1A and may be effected by means of the circuit shown in FIGURE 1B wherein the terminals 30 to 33 thereof would be connected respectively to terminals 30b to 33b. The arrangement of FIGURE 2 is particularly well adapted to fluid flow operations where large diameter ducts or pipes are required whereas the arrangement of FIGURE 1A might be employed both for general purpose gas or liquid flow operation.

Figure 5:
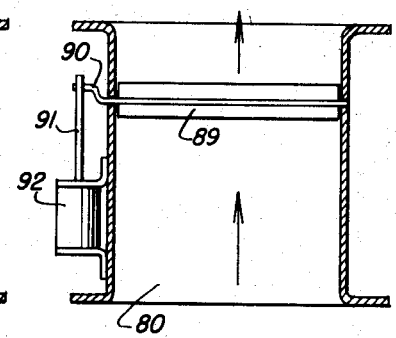
FIGURE 5 is a view of the valve assembly of FIGURE 4 taken along the lines 5—5 thereof.

FIGURES 4 and 5 illustrate an alternative arrangement for the digital valve shown in FIGURE 2. In the arrangement of FIGURE 4, the valve 80 is provided with a central diaphragm 81 including therein a plurality of rectangular slots 82, 83, 84 and 85, the cross-sectional areas of these slots are adjusted relative to one another so as to conform to the binary progression system as set forth herein. Specifically, assuming that the total control area $A_t$ of the valve is a summation of the areas 82, 83, 84 and 85, then the area of the aperture 82 would be $1/15$ of the area $A_t$, the area of the aperture 83 would be $2/15$ of the total area $A_t$, the area of the aperture 84 would be $4/15$ of the total area $A_t$, and the area of the aperture 85 would be $8/15$ of the total area $A_t$. To control flow through these apertures 82 to 85, inclusive, there is provided thereat the respectively corresponding louvers 86 to 89, inclusive. Control of these louvers between the full closed and full open position are controlled by associated actuators A, B, C and D in accordance with the manner set forth relative to the explanations of FIGURES 1A and 2 and as shown in detail in FIGURE 5.

Therein the louver 89 which is rotatable about an axis by the crank shaft 90 is operated from a solenoid 92 by means of a solenoid shaft 91 communicating with the crank 90. The digital regulating valve of this arrangement is particularly well suited for fluid flow operation wherein large sized ducts or pipes are employed.

FIGURE 6A demonstrates the broad application which may be made of the principles of the present invention and illustrates what may be considered a linear digital positioner adapted for use with valves or gates. In the arrangement of FIGURE 6A, there is shown a series of cylinder operators which include a cylinder 101, 102 and 103, each provided with a piston and piston rod 104, 105 and 106. The cylinder 103 is mounted at its closed end by means of a mounting bracket 110 to a fixed surface, its piston rod 106 is connected in turn to the closed end of the next adjacent cylinder 102; the piston rod 105 of the cylinder 102 is connected to the closed end of the next adjacent cylinder 101, and the piston rod 104 of the cylinder 101 is connected to the lever system 111 extending to the valve 112 of the regulator valve arrangement 113. The cylinder 101 is reversibly controlled by means of a control fluid supplied from a reservoir 107 and furnished thereto from a control device 114 via the control lines 115 and 116. Similarly, the cylinder 102 is reversibly controlled from a control device 117 through control lines 118 and 119, and a cylinder 103 is controlled from a control device 120 through control lines 121 and 122. The control devices 114, 117 and 120 are valves which are responsive, respectively, to the actuators A, B and C which may be the solenoids 123, 124 and 125.

Considering the operation of the linear digital positioner 100, it is to be noted that the positioner is operative into any one of eight digital positions inasmuch as but three positioner units are provided. The cylinders 101, 102 and 103 are proportioned to have strokes, such that considering the total stroke to be of a length $S_t$, the stroke of the piston rod 104 would be $\frac{1}{7}$ of the total stroke $S_t$, the stroke of the piston rod 105 would be $\frac{2}{7}$ of the total stroke $S_t$ and the stroke of the piston rod 106 would be $\frac{4}{7}$ of the total stroke $S_t$. The stroke lengths are formulated on a binary basis similar to that noted earlier wherein S (stroke length) is used instead of A (area). Thus the valve 112 of the regulator assembly 113 is operated into the first position by applying to the control terminal 126a associated with the solenoid 123 a signal for causing the piston rod 104 to extend itself a full distance of its stroke. Should the control terminal 127a associated with the solenoid 124 be energized in a manner so as to operate the solenoid 124, the piston rod 105 would be extended a full stroke so as to operate the valve 112 into the second digital position. Joint operation of the solenoids 123 and 124 would operate the valve 112 into the third digital position. Further, operation of the valve assembly 113 through the remaining four digital positions would be in accordance with the pattern set forth in FIGURE 3.

A digital rotary positioner effective for providing control to valves, gates and the like is shown in FIGURE 7. Therein there is provided a valve assembly 140 provided with a rotary valve stem 141 associated by means of a gear train 142 to a motor clutch unit 143. The motor clutch unit 143 is in turn joined by means of a gear train 144 to a motor clutch unit 145. The motor clutch unit 145 is joined by means of a gear train 146 to the motor clutch unit 147. The motor clutch units 143, 145 and 147 correspond to actuators A, B and C, respectively, and each is a single cycle device so that responsive to energization provided thereto they will in any circumstance perform but a single revolution. However, in the gear trains 142, 144 and 146 the circumference of the driven gear 142b associated with the valve stem 141 may be equal to the total drive circumferential distance $D_t$ and both the drive gear 142a and the driven gear 144b associated with the motor clutch unit 143 will be of a circumferential distance equal to $\frac{1}{7}$ of the total circumferential distance $D_t$. The drive gear 144a and the driven gear 146b associated with the motor clutch unit 145 are both of the same circumferential distance equal to $\frac{2}{7}$ of the total distance $D_t$. The drive gear 146a associated with the motor clutch unit 147 is of a circumference equal to $\frac{4}{7}$ of the total circumferential distance $D_t$. The gear ratios or circumferential travel are formulated on a binary basis similar to that noted earlier, wherein D (circumferential distance) is used instead of A (area).

The motor clutch units 143, 145 and 147 employed in this unit are of a type so that upon operation of any one of the units, the drive gear associated therewith is rotated but the individually associated driven gear is not operated. In the circumstance where the driven gear such as the gear 144b is rotated, the driving gear associated with that motor clutch unit, in this case the drive gear 142a, will be rotated in unison therewith. With this arrangement, the valve 140 will be operated through any one of eight digital steps responsive to operation of the motor clutch units 143, 145 and 147 in accordance with the operation described above with regards to FIGURE 6A and as shown in FIGURE 3.

A control arrangement for operating the digital position devices of FIGURES 6A and 7 different from that of FIGURE 1B is illustrated in FIGURE 6B. The arrangement shown therein includes three conductors 150, 151 and 152 terminated respectively by the terminals 126, 127 and 128. Wiper and contact banks 155, 156 and 157 are associated respectively with the conductors 150, 151 and 152 and correspond respectively to the actuators A, B and C. These stepping switches are operated by means of a stepping relay 158 selectively operable from a control mechanism 159 to apply ground potential to the conductors 150, 151 and 152 in accordance with the pattern shown in FIGURE 3. The stepping switches shown are for illustration purposes. Conventional digital computers and analog-to-digital converters give the same type of control signal. This type of an arrangement might be employed with a program controller where it is desired to make specific movements at specific times which movements are recorded and are utilized to operate the stepping relay 158 to cause corresponding movements of the position devices shown in FIGURE 6A or 7. The equivalent manual control can be provided by contacts 160, 161 and 162 associated respectively with the conductors 150, 151 and 152.

Figure 8:
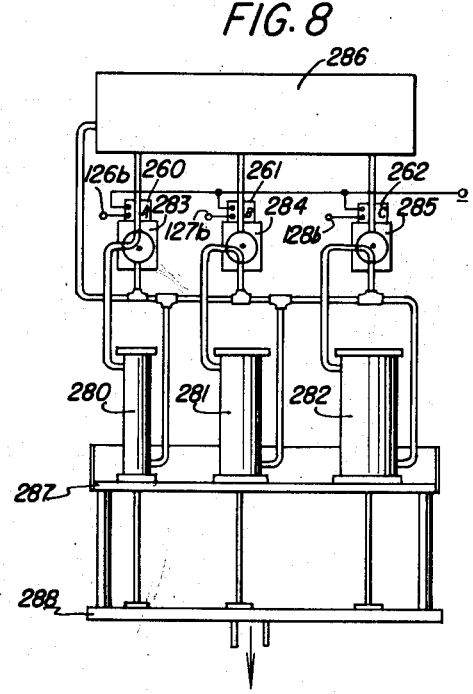
FIGURE 8 is a digital force control mechanism for utilizing the principles of the invention.

In a further variation of the arrangement in accordance with the invention, there is shown in FIGURE 8 a digital force control operator which might be either tension or compression control including the cylinders 280, 281 and 282. Pressure control to the cylinders from a central reservoir 286 is distributed by means of valves 283, 284 and 285 which are operated by solenoids 260, 261 and 262 corresponding respectively to actuators A, B and C. The cylinders are mounted to a frame 287 and the piston rods thereof extend to a yoke 288 at which the force is distributed. The quantity of force on the yoke 288 is controlled in accordance with the pattern set forth with reference to FIGURE 6A and FIGURE 7 thereby to provide digital control. The cylinder areas are proportioned in accordance with the binary progression.

The FIGURE 9 illustrates a variation of the digital rotary positioner such as shown in FIGURE 7. Specifically, therein the valve assembly 140 is controlled at its rotary valve stem 141 for providing digital flow by means of the series joined differential gear units 300, 305, 310 and 315. The units 300 and 305 are interlinked by a transmission shaft 303, the units 305 and 310 are interlinked by a transmission shaft 308, the units 310 and 315 are interlinked by a transmission shaft 313, and the unit 315 is linked to a fixed reference via the shaft 318. The input to the differential gear unit 300 is via the drive shaft 301 extending from the rotary torque motor 302; the input to the differential gear unit 305 is via the drive shaft 306 extending from the rotary torque motor 307; the input to the differential gear unit 310 is via the drive shaft 311 extending from the rotary torque motor 312; and the input to the differential gear unit 315 is via the drive shaft 316 extending from the rotary torque motor 317. The rotary torque motors 302, 307, 312 and 317 may be solenoids, for example, arranged to rotate one revolution in one direction when energized and to restore itself by rotating one revolution in the opposite direction when de-energized. Thus each of the drive shafts 301, 306, 311 and 316 normally rotate but one revolution in response to operation of the corresponding rotary torque motor.

The gears in each of the differential gear units 300, 305, 310 and 315 are arranged to establish a specific gear ratio between the input gear on the drive shaft and the output gears on the transmission shafts. Thus, in the differential gear unit 300 the gear ratio between the input gear and the output gears is 15 to 1; in the differential gear unit 305, the ratio between the input gear and the output gears is 15 to 2; in the differential gear unit 310 the ratio between the input gear and the output gears is 15 to 4; and in the differential gear unit 315, the ratio between the input gear and the output gears is 15 to 8.

Further, the differential gear units are arranged to either add or subtract the motions applied thereat through both the input gears and the output gears. Thus in the circumstance where only the rotary torque motor 307 is energized, the drive shaft 306 is rotated through one revolution causing the transmission shaft 303 to be rotated through 2/15 of a revolution, which motion is transmitted via the differential gear unit 300 to the valve stem 141 so as to rotate the valve stem through 2/15 of a revolution. Thereafter, and while the rotary torque motor 307 is maintained energized, should the rotary torque motor 312, for example, be energized, the transmission shaft 308 is rotated from the differential gear unit 310 through 4/15 of a revolution. This motion is transmitted via the differential gear unit 305 to further rotate the shaft 303 through 4/15 of a revolution and via the differential gear unit 300 to further rotate the valve stem 141 through an additional 4/15 of a revolution. Thus by operation of the rotary torque motors 307 and 312, the rotary valve stem 141 will be rotated through 6/15 of a revolution.

It may be seen that by utilization of an arrangement such as shown in FIGURE 9, that the valve assembly 140 can be selectively operated through sixteen incrementally spaced flow positions from full closed to full open.

In FIGURES 10 and 11 there is illustrated in a schematic manner further variations of digital control arrangements as specifically applied to pumps or compressors. The arrangement of FIGURE 10 shows such a pump system utilizing rotary pumps and the arrangement of FIGURE 11 shows such a system employing double-acting reciprocating piston type pumps.

Giving specific consideration to the arrangement shown in FIGURE 10, rotary pumps 325, 330, 335 and 340 are all driven from a constant speed motor 345 of any suitable type. Input fluid to the pumps 325, 330, 335 and 340 are provided by means of an input manifold 350 extending from a fluid reservoir 351. Thus the rotary pumps as long as they are energized by the motor 345 are continuously pumping fluid from the reservoir 351. To take care of the output flow from the rotary pumps there is provided a return manifold 352 extending to the reservoir 351 and an output manifold 353 extending to a user or operator, not shown. The return manifold 352 and the output manifold 353 are coupled to the outputs of the rotary pumps 325, 330, 335 and 340 by means of solenoid operated valves 326, 331, 336 and 341, respectively. The solenoid-valve structure employed may be identical to that utilized in the structure of FIGURE 8 and specific reference is made to the arrangement including, for example, the solenoid 260 and the valve 283 of FIGURE 8. By use of such an arrangement, the output from each of the rotary pumps is distributed either to the return manifold 352 or to the output manifold 353.

The pumping rates of the rotary pumps are arranged to bear a proportionate relationship to one another such as that set forth elsewhere in this application. Specifically, assuming, for example, that the normal pumping rate of the rotary pump 325 is chosen as ten gallons per minute, the pumping rate of the rotary pump 330 would be twenty gallons per minute, that of the rotary pump 335 would be forty gallons per minute and that of the rotary pump 340 would be eighty gallons per minute. Thus by selective operation of the solenoid valve arrangement 326, 331, 336 and 341, the flow in the output manifold 353 can be digitally controlled between zero gallons per minute to 150 gallons per minute and that flow rate could be instantly controlled to any selected digital increment.

In the varied digital pump arrangement of FIGURE 11, double-acting pistons 355, 360, 365 and 370 are substituted for the rotary pumps in the arrangement of FIGURE 10. Except as to specific details in the associated structure, both arrangements operate essentially the same.

Giving consideration to the arrangement of FIGURE 11, the double-acting piston 355 is provided with a two-branch input conduit from the manifold 350, each branch including a one way output flow check valve 356. The output from the piston 355 is directed to the solenoid-valve 326 by means of a two branch output conduit including in each branch a one way input flow check valve 357. Similarly, the pump 360 is provided with a two branch input conduit each branch including a one way output flow check valve 364 and the output is through a two branch conduit 361 including in each branch an input flow check valve 362; the pump 365 is provided with a two branch input conduit each branch including a check valve 369 and a two branch output conduit 366 each branch including an input check valve 367; and the pump 370 is provided with a two branch input conduit each branch including an input check valve 374 and an output branch arm 371 each branch including an input check valve 372. The pumps 355, 360, 365 and 370 are driven from a common crankshaft 379 operated by the motor 345 and via the piston rods 375, 376, 377 and 378, respectively.

It is obvious that the arrangement of FIGURE 11 is also a continuous flow pumping system wherein the output of the pumps are directed either to the return manifold 352 or to the output manifold 353 in accordance with the controlled positions of the solenoid valve 326, 331, 336 and 341. In the arrangement shown in FIGURE 11 the solenoid valves are operated so that only the output from the pump 370 is directed to the output manifold 353. Assuming, as before and by way of example that the pump 355 provides a flow at the rate of ten gallons per minute, the pump 360 provides a flow at the rate of twenty gallons per minute, the pump 365 provides a flow at the rate of forty gallons per minute, and the pump 370 provides a flow at the rate of eighty gallons per minute. The flow in the illustrated condition to the manifold 355 would be eighty gallons per minute. In this manner the flow of fluid in the manifold 355 can be controlled between zero gallons per minute and 150 gallons per minute.

It is to be understood that although the arrangement of FIGURE 11 is shown to be a double-acting piston, there is no inhibition against utilizing pistons of the single action type. Although the arrangements of FIGURES 10 and 11 as disclosed relate to a digital pumping system, it is appreciated that such an arrangement could be used additionally for evacuation of a fluid from a chamber. Naturally, the fluid could be liquid or gaseous in the pumping or evacuation arrangements.

A digital speed control assembly utilizing the principles of the present invention, is illustrated as a further variation in FIGURE 12. Therein there is shown an output drive wheel 380 administered through a plurality of differential gear units 385, 390, 395 and 400. The input to the differential gear units is controlled from a constant speed variable torque motor 405, the gear sets 407, 410, 415 and 420, and the solenoid clutch units 425, 430, 435 and 440.

The differential gear unit 385 is linked to the differential gear unit 390 through a transmission shaft 386 and to the solenoid clutch 425 through a drive shaft 387. Similarly, the differential gear unit 390 is linked to the unit 395 through a transmission shaft 391 and to the solenoid clutch unit 430 through a drive shaft 392; the differential gear unit 395 is linked to the differential gear unit 400 via the transmission shaft 396 and to the solenoid clutch unit 435 via the drive shaft 397, and the differential gear unit 400 is linked to a fixed reference via the shaft 401 and to the solenoid clutch unit 440 through a drive shaft 402. The gear ratios in the differential gear units are the same for each unit and, for example, may provide a one to one ratio between the drive shafts and the transmission shafts.

In the gear sets 407, 410, 415 and 420, there is included a drive gear 408, 411, 416 and 421, respectively, and a driven gear 409, 412, 417 and 422, respectively. The diameters of the gears in each of the sets are arranged so that the rotational speed of the gear 412 is two times that of the gear 409, the rotational speed of the gear 417 is four times that of the gear 409 and the rotational speed of the gear 422 is eight times that of the gear 409. Accordingly, all of the gear sets are normally driven from the constant speed variable torque motor 405 and it is by selective operation of the solenoid clutch arrangements 425, 430, 435 and 440 that the variable speeds are distributed through the differential gear units to the drive wheel 380. It is understood, of course, that when the solenoid in the solenoid clutch arrangements is de-energized and the clutch disengaged, the associated drive shafts 387, 392, 397 and 402 are locked against rotation, thereby permitting the transmission shafts at each differential gear unit to be directly interlinked. For example, in response to the operation of the solenoid clutch unit 425, the clutch portion is engaged so as to connect the driven gear 409 directly with the drive shaft 387 of the differential gear unit 385. In this instance, assuming, by way of example, a one to one gear ratio in the differential gear unit 385 and a speed of ten revolutions per minute for the gear 409, the output wheel 380 will be driven at a rate of ten revolutions per minute. Thereafter, should the solenoid clutch unit 385 be operated, the driven gear 417 would be connected directly with the drive shaft 387 of the differential gear unit 395 and assuming the gear 417 rotating at a rate of forty revolutions per minute, this motion would be transmitted via the transmission shaft 391, the differential gear unit 390, the transmission shaft 386 and the differential gear unit 385, added to the rotational motion already present within the gear unit 385 and applied to the output shaft 388 to the driven wheel 380. At that instant the speed of the driven wheel 380 would become fifty revolutions per minute. In the example chosen, it is clear that the rotational speed of the driven member 380 can be controlled between zero r.p.m.'s and 150 r.p.m.'s instantly at discrete variations of 10 r.p.m. Accordingly, the arrangement thereof is a digitally controlled variable speed device.

Figure 13:
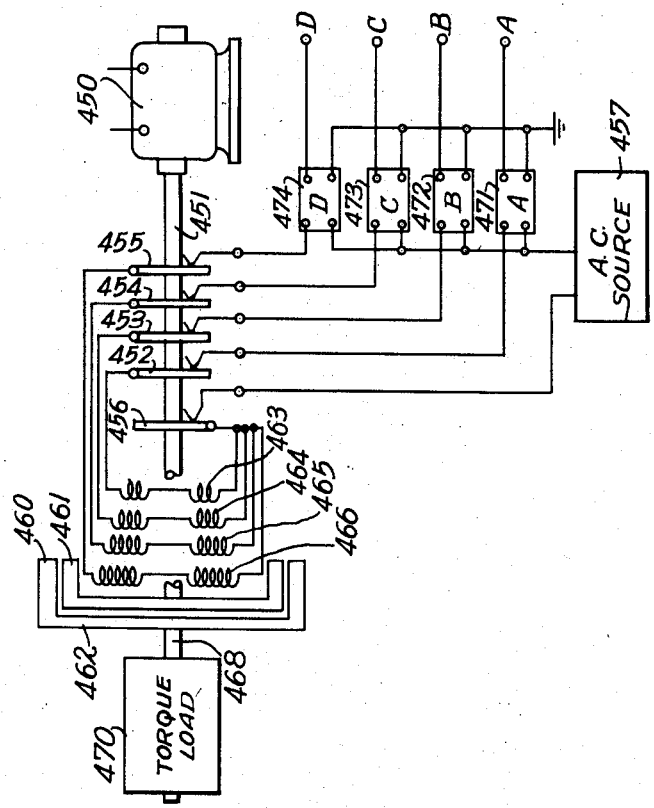
FIGURE 13 is a schematic representation of a digital torque control arrangement utilizing the principles of the present invention.

The diagram of FIGURE 13 shows a digital torque control arrangement utilizing the principles of the invention. Therein there is illustrated an arrangement including a constant torque drive 450, a clutch 460 of the eddy current type and a torque load 470. The clutch 460 includes a drive member 461 connected directly to the constant torque motor 450 via a shaft 451, and a driven member 462 connected directly to the load device via a shaft 468. As is true in eddy current clutch practice, the amount of torque distributed from the motor 450 to the load 470 is determined by the "slip" or magnetic coupling between the drive member and driven member of the clutch 460. For purposes of controlling the magnetic flux, the drive member 461 is provided with a clutch winding 463, a clutch winding 464, a clutch winding 465 and a clutch winding 466. One end of each of the windings is connected to a brush-slipring arrangement 456 which is returned to an alternating current source 457. The other end of the winding 463 is connected via the brush-slipring arrangement 452 to a solenoid control 471, the other end of the winding 464 is connected through a brush-slipring arrangement 453 to a solenoid control 472 and the other end of the winding 466 is connected via the brush-slipring arrangement 455 to the solenoid control 474. The solenoids act to selectively connect the brushes of the brush-slipring arrangement to the common source of alternating current 457.

The coils 463, 464, 465 and 466 are arranged and wound so that the field strength provided thereby is proportioned according to the established pattern. Accordingly, and by way of example, in the circumstance wherein the clutch winding 463, when energized, would cause a field strength providing a torque of ten-foot pounds to the driven member 462, the clutch winding 464 would be arranged to provide a torque of twenty-foot pounds, the clutch winding 465 would be arranged to provide a torque of forty-foot pounds and the clutch winding 466 would be arranged to provide a torque of eigthy-foot pounds. These torques are distributed directly to the load 470. Thus, energization of the clutch winding 465 would provide four times as much torque at the load 470 as energization of the clutch winding 463.

Illustrating the manner of use, assuming that the solenoid control 471 is operated, alternating current is distributed through the windings 463 via the brush-sliprings 452 and 456 to establish, for example, a field strength providing a torque of ten-foot pounds to the load 470. Thereafter, energization of the solenoid control 474 would apply alternating current via the brush-slipring arrangement 455 through the clutch winding 466 and the brush-slipring arrangement 456 thereby increasing the field strength in the clutch 460 thereby to increase the torque applied to the load 470 from ten foot-pounds to ninety foot-pounds. Accordingly, by selective operation of the control solenoids 471, 472, 473 and 474, the torque to the output load 470 can be digitally controlled in the example from zero foot-pounds to 150 foot-pounds.

By way of review, it is to be noted that the arrangements of FIGURES 1 to 4, 6, 7, 8, 9, 10, 11, 12 and 13 illustrate variously, flow controls, linear distance controls, rotary distance controls, force controls, pressure controls, speed controls and torque controls. These are meant to illustrate the various dynamical operations than can be performed through the utilization of the principles of the present invention. Further, it is to be noted that each of the arrangements illustrated includes a user or operator of the dynamical function performed by a machine, usually a load device of some type, a plurality of sources of the dynamical control such as valve gates, pistons, gear units, electrical windings and so forth which can be considered to be dynamical suppliers, and a means intermediate the dynamical operator and the dynamical suppliers for accumulating the dynamical functions from the suppliers and transmitting these functions onto the operator. Further, various incidental references have been made to means for selectively controlling the dynamical suppliers. In order to give a more complete understanding, consideration is given hereinafter to the broad applications of the principles above evolved.

To generalize the above described arrangement, so as to render the principles thereof applicable to devices other than those specifically disclosed, reference is made to FIGURES 14, 15A and 15B. By reference to the figures, it will be noted that the generalized consideration is in terms of vector analysis, and this by virtue of the fact that not only does vector analysis lend itself ideally to the easy understanding of the invention, but also because, for the most part, the physical units under consideration are vector quantities made up of components including both magnitude and direction. It is to these vector quantities that any dynamical operator is responsive, and it follows then that to control the response to a dynamical operator, it is needed to control the vector quantity input thereto.

Giving specific consideration to FIGURE 14, the block schematic arrangement shown therein includes a digital programmer 510, a control terminal board 520, a plurality of vector suppliers 530, a vector cumulator 540 and a dynamical operator 550.

A digital programmer 510 may be any suitable type of equipment either automatic or manual which can provide any one of a plurality of discrete incremental control points on a time basis. In the illustration of FIGURE 14, the digital programmer 510 has been selected to provide sixteen incremental control points and for easy understanding, it will be convenient to consider the programmer as a digital computer which is arranged to selectively provide as an output certain one of the control points at certain times throughout a control interval. The control terminal board 520 is a means by which the digital programmer 510 is connected to the series of dynamical vector suppliers 530 to effect control of the latter.

The plurality of dynamical vector suppliers 530 include the dynamical vector suppliers 531, 532, 533, and 534 each further identified respectively as dynamical vector suppliers A, B, C and D. The vector outputs of these various suppliers have a magnitude and direction as illustrated in FIGURE 15A wherein the output of the supplier A is one unit of magnitude, the output of the supplier B is two units, the output of the supplier C is four units, and the output of the supplier D is eight units, all in accordance with the mathematical relationship set forth above. Further, each of the dynamical vector suppliers is of the binary type, that is, controllable between either an "off" or an "on" position and supplying no output in the "off" position and supplying its characteristic vector in the "on" position. It is evident that these series of dynamical vector suppliers can be operated into any one of sixteen possible conditions varying from all "off" to all "on." The outputs from the dynamical vector suppliers 531, 532, 533 and 534 are applied, respectively, through the conduits 536, 537, 538 and 539 to the dynamical vector cumulator 540.

The dynamical vector cumulator 540 performs a function of collecting and adding the dynamical vectors applied thereto through the conduits 536 to 539 and applying the vector sum thereof by means of the conduit 541 to the input of the dynamical operator 550. The comparative conduction capacities of the conduits 536 to 539 and 541 are indicated graphically by the different widths assigned thereto. FIGURE 15B illustrates in an orderly numerical progression, the vector output from the cumulator 540 in response to various operational combinations of the dynamical vector suppliers 531, to 534, as identified by their alternative designations A to D. From this presentation, it is seen that the cumulator 540 provides any one of sixteen vector outputs of a digital nature which differ one from another by discrete incremental magnitude differences. It is to this variety of dynamical vectors quantities that the dynamical operator 550 responds directly. Accordingly, the dynamical operator 550 is made to be a digital responsive device and it is controlled directly in accordance with the combination of the dynamical vector suppliers 531 to 534 operated at any given instant.

Giving consideration to the manner in which the series of dynamical vector suppliers 530 are controlled, the control terminal board 520 is arranged to interconnect the output terminals T0 to T15 of the programmer 510 to the input terminals 521, 522, 523 and 524 associated respectively with the dynamical vector suppliers 531, 532, 533 and 534. Connection between the various output terminals of a digital programmer and the input terminals of the dynamical vector suppliers is in a fashion so as to achieve, upon operation of the suppliers, a correlation between the incremental control provided by the digital programmer and the digital output of the dynamical vector cumulator 540. To achieve this correlation, connections are made at the terminal board 520 between the output terminals T0 to T15 of the digital programmer 510 and the input terminals 521 to 524 of the dynamical vector suppliers 530 in a manner as illustrated.

Considering now the operation of the arrangement as set forth in FIGURE 14 and considering specifically the FIGURES 16A, 16B, 16C and 16D, it will be understood that in the circumstance where the digital programmer 510 is programmed so as to provide, on a time basis, digital outputs at the terminals indicated and in the order indicated in FIGURE 16A, the vector suppliers A, B, C and D will be at the respective programmed times operated from the digital controller 510 in accordance with the pattern set forth in FIGURE 16B. At the selected times between T0 and T15 and for the respective intervals therebetween, the vector quantities applied to the dynamical vector cumulator 540 and the adder functions taking place therein, are illustrated in FIGURE 16C. The dynamical vector quantities added in the cumulator are applied directly to the dynamical operator 550 so that the pattern of operation of the dynamical operator 550 will be in accordance with that shown in FIGURE 16D. Thus, through use of a system such as shown in FIGURE 14, a dynamical operator such as a furnace, a power lift, a speed drive, a pressure system, an evacuation system or a torque device, for example, could be operated from a quiescent stage at time T0 through an operational cycle which might span any period of time T0 to T15, for example, completely, automatically and under the direction of the digital programmer 510.

From the foregoing, it is clear that there has been provided new, improved and unique means for achieving easy control of an analog type of dynamical operator directly in accordance with the output of a digital controller and utilizing a minimum number of physical control elements. Specifically, it is clear that there has been provided a system including a digital controller for directing the operation of a dynamical operator, wherein the controller can provide $2^n$ discrete incremental control signals, an arrangement including a series of $n$ number binary dynamical sources which are selectively operative individually and in combination to provide $2^n$ operational combinations, control means between the digital controller and the series of dynamical sources for operating the sources into any one of the $2^n$ operational combinations in accordance with corresponding ones of the $2^n$ control signals from the digital controller, and means for accumulating the output of the dynamical sources and applying the outputs thereof to the dynamical operator to be controlled. In the arrangement considered, the dynamical sources in the series are further arranged to supply in one binary position a vector output that is double the vector output of the next preceding dynamical source in the series. By utilization of such an arrangement, it is possible to control a dynamical operator of the analog type easily and accurately through a plurality of digital positions directly in accordance with the output of a digital controller.

The specific arrangements described herein are meant to illustrate the general principles of the invention and it is understood that other variations and modifications of these arrangements may be made by those skilled in the art. It is intended to cover in the appended claims all such variations and modifications as fall within the true spirit and scope of the invention.

What is claimed is:

1. In a system including a digital controller for rendering control direction to an operator controlled in accordance with the amount of movement applied thereto wherein the digital controller provides $2^n$ discrete incremental control signals, the combination comprising a series of $n$ number of movement vector suppliers, each of said movement vector suppliers in said series being selectively operative into an off condition and into an on condition thereby providing $2^n$ possible operational combinations for said $n$ number of suppliers, means for selectively operating said suppliers into said off condition and said on condition from said digital controller, any one of said suppliers in said series supplying in said off condition a minimal movement vector output that is equal to the minimal vector output of any other supplier in said series, and supplying in said on condition an operational movement vector output that is double the operational movement vector output of the next preceding movement vector supplier in said series, means for cumulating the vector outputs of said series of vector suppliers thereby to provide from said $2^n$ possible operational combinations a corresponding $2^n$ cumulative movement vector wherein any one of said cumulative movement vectors differs from every other cumulative movement vector in magnitude by at least a discrete increment, means for transmitting said cumulative vectors to said operator, and connector means between the output of said digital controller and said operating means for said movement vector suppliers for selectively operating said suppliers from said controller in accordance with any one of said $2^n$ discrete increment control signals so as to provide correlation with the corresponding one of said $2^n$ discrete incremental movement cumulative vectors at said cumulating means, whereby the selection of any one of said control signals in said digital controller transmits a corresponding cumulative movement vector to said movement operator.

2. In the system set forth in claim 1 wherein the movement operator is the gate of a valve device, the combination including a fixed member, a rotatable member, a series of $n$ number of differential gear units each including a drive shaft and a pair of transmission shafts, means joining said differential gear units in series between said fixed member and said rotatable member, and a series of $n$ number of motor units connected to said corresponding drive shafts each selectively operable in reverse cycles in accordance with the control signals from the digital controller, wherein said differential gear units comprise said movement vector suppliers, wherein said motor units comprise the means for selectively operating said suppliers, wherein said series connection of said differential units comprises said cumulator and wherein said rotatable member is joined rigidly to the gate of the valve device for transmitting thereto the cumulative movement vectors.

3. In a system including a digital controller for rendering controlled direction to a torque load wherein the digital controller provides $2^n$ discrete incremental control signals, the combination comprising a torque motor, an eddy current clutch device provided with a rotatable input member driven from said torque motor and a rotatable output member for driving said torque load and a series of $n$ number of inductive winding mounted on one of said members for controlling electro-magnetically the torque coupling between said members, a source of current for energizing said windings, and a series of $n$ number of switches corresponding to said inductive windings each selectively operable in accordance with control signals from the digital controller for for alternatively energizing or de-energizing said inductive windings from said source of current thereby providing $2^n$ possible operational combinations of said windings, each of said combinations of inductive windings and switches of said series supplying in said operable condition a torque coupling that is double the torque coupling supplied from the next preceding combination of inductive windings and switches in said series, wherein there is accumulated at said output member and connected torque load any one of $2^n$ cumulative torque vectors corresponding to said $2^n$ possible operational combinations of said series of inductive windings, and wherein any one of said cumulative torque vectors differs from every other cumulative torque vector in magnitude by at least a discrete increment.

4. In a system including a digital controller for rendering controlled direction to a flow of fluid in a conduit wherein the digital controller provides $2^n$ discrete incremental control signals; the combination comprising a series of $n$ number of gate valves each operative between an open position and a closed position thereby providing $2^n$ possible operational combinations for said gate valves, a corresponding series of $n$ number control switches each selectively operable in accordance with control signals from the digital controller for alternatively opening and closing the corresponding gate valves, any one of said gate valves in said series supplying in said opened condition a flow vector output that is double the flow vector output of the next preceding gate valve in said series, a source of flow liquid for said gate valves, and an output manifold from said gate valves to the flow conduit, wherein there is accumulated at said output manifold any one of $2^n$ cumulative flow vectors corresponding to said $2^n$ possible operational combinations, and wherein any one of said cumulative flow vectors differs from every other cumulative flow vector in magnitude by at least a discrete increment.

5. In a system including a digital controller for rendering controlled direction to a variable speed rotatable shaft wherein the digital controller provides $2^n$ discrete incremental control signals; the combination comprising a series of $n$ number of gear sets, a motor for driving said gear sets at a predetermined angular speed, a series of $n$ number differential gear units each including a drive shaft and a pair of transmission shafts, said differential gear units being connected in series at said transmission shafts between a fixed member and said driven shaft output member, and a series of $n$ number solenoid clutches each selectively operable in accordance with control signals from the digital controller for alternatively connecting and disconnecting a gear set from the drive shaft of the corresponding differential gear units thereby providing $2^n$ possible operational combinations for said gear units, each of said interconnected gear sets and differential gear units in the interconnected condition supplying an operational speed vector output that is double the operational speed vector output of the next preceding interconnected gear set and differential gear unit in the series, wherein there is accumulated at said rotatable shaft output member any one of $2^n$ cumulative speed vectors corresponding to said $2^n$ possible operational combinations and wherein any one of said output speed vectors differs from every other output speed vector in magnitude by at least a discrete increment.

References Cited in the file of this patent

UNITED STATES PATENTS

| | | |
|---|---|---|
| 691,692 | Von Zweigbergk | Jan. 21, 1902 |
| 1,825,934 | Bing | Oct. 6, 1931 |
| 2,229,903 | Schmohl et al. | Jan. 28, 1941 |
| 2,672,965 | Miller | Mar. 23, 1954 |
| 2,717,311 | Ogletree | Sept. 6, 1955 |
| 2,771,790 | Munschauer | Nov. 27, 1956 |
| 2,870,429 | Hales | Jan. 20, 1959 |
| 2,904,070 | Lynott | Sept. 15, 1959 |
| 2,916,205 | Litz | Dec. 8, 1959 |
| 2,931,928 | Fehn | Apr. 5, 1960 |
| 2,969,042 | Litz et al. | Jan. 24, 1961 |